US012809103B2

(12) United States Patent
Quan et al.

(10) Patent No.: US 12,809,103 B2
(45) Date of Patent: Nov. 24, 2026

(54) OPTICAL PORT ASSEMBLY AND OPTICAL MODULE

(71) Applicant: Accelink Technologies Co., Ltd., Wuhan (CN)

(72) Inventors: Benqing Quan, Wuhan (CN); Beili Song, Wuhan (CN); Yubang Sheng, Wuhan (CN); Mengyang Song, Wuhan (CN); Deling Zhang, Wuhan (CN)

(73) Assignee: Accelink Technologies Co., Ltd., Wuhan City (CN)

( * ) Notice: Subject to any disclaimer, the term of this patent is extended or adjusted under 35 U.S.C. 154(b) by 409 days.

(21) Appl. No.: 18/559,642

(22) PCT Filed: Aug. 6, 2021

(86) PCT No.: PCT/CN2021/111167
§ 371 (c)(1),
(2) Date: Nov. 8, 2023

(87) PCT Pub. No.: WO2022/236982
PCT Pub. Date: Nov. 17, 2022

(65) Prior Publication Data
US 2024/0377597 A1 Nov. 14, 2024

(30) Foreign Application Priority Data
May 14, 2021 (CN) ......................... 202110529955.6

(51) Int. Cl.
*G02B 6/42* (2006.01)

(52) U.S. Cl.
CPC ......... *G02B 6/4277* (2013.01); *G02B 6/4292* (2013.01)

(58) Field of Classification Search
CPC ... G02B 6/4277; G02B 6/4292; G02B 6/3825
See application file for complete search history.

(56) References Cited

U.S. PATENT DOCUMENTS

2015/0125119 A1* 5/2015 Droesbeke ........... G02B 6/3885 439/372
2016/0103284 A1 4/2016 Nguyen et al.

FOREIGN PATENT DOCUMENTS

CN 102902023 A 1/2013
CN 203072303 U 7/2013
(Continued)

OTHER PUBLICATIONS

Supplemental European search report dated Feb. 28, 2025 for EP App No. 21 94 1551.
(Continued)

*Primary Examiner* — John Bedtelyon
(74) *Attorney, Agent, or Firm* — Lei Fang, Esq.; Smith Tempel Blaha LLC

(57) ABSTRACT

An optical port assembly and optical module. The optical port assembly comprises a connector connected with an optical fiber, an adaptor having an accommodation cavity, and a shield extending into the accommodation cavity to be fixed. The shield has a hollow matching cavity, into which the adaptor extends to fixedly connect with the adaptor and the shield. The shield is wrapped on the adaptor to define the relative position between the shield and the adaptor, thereby defining the relative position between the shield and optical fiber then defining the position of an opening on the shield for allowing the optical fiber to pass through. The relative position between the opening and optical fiber is fixed, whereby the size of the opening may be set to be approximately the same as that of the cross-section of the optical fiber to minimize of the opening and reduce the electromagnetic leakage thereat.

20 Claims, 5 Drawing Sheets

(56) References Cited

FOREIGN PATENT DOCUMENTS

| | | | |
|---|---|---|---|
| CN | 105301710 | A | 2/2016 |
| CN | 110112600 | A | 8/2019 |
| CN | 209281013 | U | 8/2019 |
| CN | 112230349 | A | 1/2021 |
| CN | 112327422 | A | 2/2021 |
| CN | 112363280 | A | 2/2021 |
| CN | 112584688 | A | 3/2021 |
| EP | 1795929 | A1 | 6/2007 |
| JP | 2001296457 | A | 10/2001 |
| WO | 02/079841 | A1 | 10/2002 |

OTHER PUBLICATIONS

EP Search & Examination Opinion (cf Form 1507) for EP App No. 21 94 1551.
International Search Report for PCT/CN2021/111167 dated Dec. 28, 2021.
International Written Opinion for PCT/CN2021/111167 dated Dec. 28, 2021.
Chinese SIPO Search report dated Apr. 12, 2022 for the priority Chinese application No. 2021105299556.

* cited by examiner

OPTICAL PORT ASSEMBLY AND OPTICAL MODULE

CROSS-REFERENCE TO RELATED APPLICATION(S)

This application is a 371 U.S. National Phase of PCT International Application No. PCT/CN2021/111167 filed on Aug. 6, 2021, which claims the priority of a Chinese patent application with Ser. No. 202110529955.6, filed on May 14, 2021, the disclosure of each of which is hereby incorporated by reference herein in its entirety.

TECHNICAL FIELD OF THE DISCLOSURE

The present disclosure relates to the technical field of optical communications, and in particular, relates to an optical port assembly and an optical module.

BACKGROUND

Electromagnetic interference refers to the electromagnetic interference phenomenon generated by the action of electromagnetic waves and electronic components. In optical modules, electromagnetic leakage easily occurs at the connection of each component, wherein the physical interface optical ports used for connecting the optical fiber are more easily to generate electromagnetic leakage and enhance the intensity of electromagnetic interference because it is generally exposed outside the equipment. The related optical modules use a design scheme that a metal housing surrounds the optical fiber to avoid or reduce electromagnetic leakage, however, the gap between the metal housing and the optical fiber is large, and the electromagnetic leakage is still large, which leads to poor electromagnetic shielding effects.

SUMMARY

In view of the above, the present disclosure intends to provide an optical port assembly and an optical module, so as to solve the technical problem of how to reduce the electromagnetic leakage.

In order to realize the above-mentioned purpose, the technical solution used in the present disclosure is an optical port assembly, comprising a connector, one end of the connector along a first direction being connected with an optical fiber; an adaptor having an accommodation cavity extending along the first direction, one end of the connector far away from the optical fiber extending into the accommodation cavity along the first direction; a shield, which has a hollow matching cavity and is provided with openings at two opposite ends along the first direction, being in connection with the matching cavity, the adaptor being fixed by extending into the matching cavity through one of the openings, and the other of the openings being used for inserting the optical fiber; wherein a size of the other of the openings is substantially the same as a section size of the optical fiber along a second direction; and the first direction is substantially perpendicular to the second direction.

In some embodiments, the shield comprises a first shield cover and a second shield cover which are detachably connected, and the first shield cover and the second shield cover are connected to form the matching cavity.

In some embodiments, the first shield cover is set with a first limit piece, the second shield cover is set with a second limit piece, and the first limit piece abuts against the second limit piece to limit an offset of the first shield cover in the first direction relative to the second shield cover.

In some embodiments, at least one of the first shield cover and the second shield cover is set with a limit piece to limit an offset of the first shield cover in the second direction relative to the second shield cover.

In some embodiments, the first shield cover is set with a first notch, the second shield cover is set with a second notch, and in a state where the first shield cover is connected with the second shield cover, the first notch is connected with the second notch to form the other of the openings.

In some embodiments, the first shield cover comprises a first body and a first flanging, the first flanging being set at a position of the first body near the first notch and protruding from the first body along the first direction; and the second shield cover comprises a second body and a second flanging, the second flanging being set at a position of the second body near the second notch and protruding from the second body along the first direction.

In some embodiments, the first shield cover is set with a first protrusion, the second shield cover is set with a first groove, and the first protrusion extends into the first groove to connect the first shield cover and the second shield cover; alternatively, the first shield cover is set with a first groove, the second shield cover is set with a first protrusion, and the first protrusion extends into the first groove to connect the first shield cover and the second shield cover.

In some embodiments, one end of the shield near the one of the openings is provided with a reed which extends along a first direction, and the reed has a radian protruding to a direction far away from the matching cavity.

In some embodiments, the shield is set with a first clamping piece, the adaptor is set with a second clamping piece, and the first clamping piece and the second clamping piece are clamped with each other to fix the shield and the adaptor.

In some embodiments, the adaptor is set with a first stopper, the connector is set with a second stopper, and the first stopper abuts against the second stopper in the first direction.

The present disclosure further provides an optical module, comprising the optical port assembly of any of the above-mentioned claim; a housing having a hollow installation groove, the optical port assembly being installed in the installation groove.

In some embodiments, the housing is set with a first fixing piece, the optical port assembly is set with a second fixing piece, and the first fixing piece is connected with the second fixing piece to fix the optical port assembly in the installation groove.

The beneficial effects of the present disclosure are embodied by an optical port assembly and an optical module which are intended to be provided by the present disclosure, comprising a connector, an adaptor, and a shield. The connector is connected with an optical fiber, the adaptor has an accommodation cavity, into which the connector extends to be fixed, so that the relative position between the connector and the adaptor is fixed. The shield has a hollow matching cavity, and the adaptor extends into the matching cavity to fixedly connect the adaptor and the shield, so that the relative position between the shield and the adaptor is fixed, and thus, the position between the shield and the optical fiber is relatively fixed too. In the present disclosure, the shield is completely wrapped onto the adaptor, which increases the wrapping range of the shield, and meanwhile, limits the relative position between the shield and the adaptor. In this way, the relative position between the shield and the optical fiber is further fixed, and then the position of the opening on the shield, through which is for the optical fiber to pass, is determined. Moreover, due to the fact that the relative position between the opening and the optical fiber is fixed, the size of the opening may be approximately the same as that of the optical fiber in a direction perpendicular to the length direction of the optical fiber, so as to minimizate of the opening, and then reduce the electromagnetic leakage at the second opening, and enhancing the effect of the electromagnetic shielding.

BRIEF DESCRIPTION OF THE DRAWINGS

In order to more clearly explain the technical solutions in the embodiments of the present disclosure, the drawings that need to be used in the description for embodiments will be briefly introduced below.

LIST OF REFERENCE SIGNS

Figure 1:
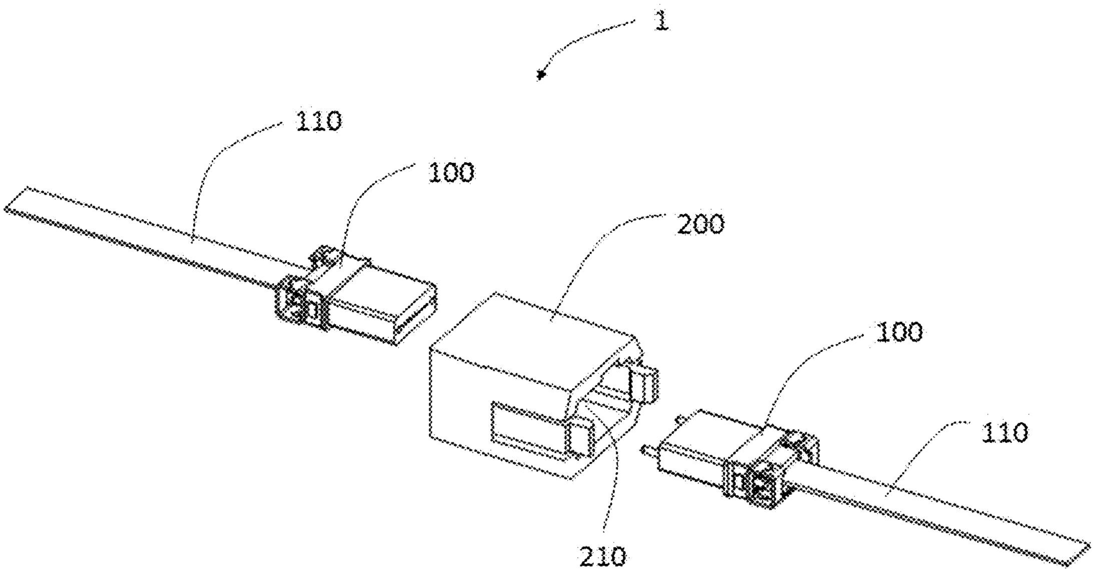
FIG. 1 is a structure schematic diagram of an optical fiber butt joint according to an embodiment of the present disclosure.

1 optical post assembly
100 connector
110 optical fiber
120 second stopper
200 adaptor
210 accommodation cavity
220 housing
230 second clamping piece
240 first stopper
250 second fixing piece
300 shield
310 matching cavity
320 first opening
330 second opening
340 first shield cover
3401 first body
341 first sidewall
3411 first protrusion
342 second sidewall
343 third sidewall
344 first bottom wall
345 first limit piece
3451 first notch
3452 first flanging
350 second shield cover
3501 second body
351 fourth sidewall
3511 first groove
352 fifth sidewall
353 sixth sidewall
354 second bottom wall
355 second limit piece
3551 second notch
3552 second flanging
356 locating piece
360 reed
370 first clamping piece
400 housing
410 installation groove
420 upper housing
421 second groove
430 lower housing
441 third groove
440 first fixing piece

DETAILED DESCRIPTION

In order to make those skilled in the art better understand the technical solutions of the present disclosure, the technical solutions in the embodiments of the present disclosure will be clearly and completely described below in conjunction with the accompanying drawings in the embodiments of the present disclosure. Obviously, the described embodiments are merely a part of embodiments of the present disclosure, but not the whole embodiments of the present disclosure. Based on the embodiments of the present disclosure, all other embodiments obtained by those skilled in the art without inventive labor shall fall within the protection scope of the present disclosure.

In the following description, the related terms “first, second, third, fourth, fifth, sixth . . . ” are only for distinguishing different objects, and do not mean that there are similarities or relationships between each object. It should be understood that the involved direction descriptions, i.e. “up”, “down”, “left” and “right” are all directions under normal using state.

It should be noted that, the term “comprising”, or any other variation thereof herein are intended to encompass a non-exclusive inclusion, such that a process, a method, an article, or a device comprising a series of elements not only includes those elements, but also includes other elements not expressly listed, or further includes an element inherent to such a process, method, article, or apparatus. Without further limitation, an element defined by a clause “including . . . ” does not exclude the existence of other identical elements in a process, a method, an article or a device that includes the element. The term “connection” includes both direct connection and indirect connection unless special explanation.

Specific embodiments in the present disclosure will be described in detail below in conjunction with the accompanying drawings.

The present disclosure provides an optical port assembly and an optical module, wherein an optical port assembly 1 is used to provide a physical interface for connecting an optical fiber, so that two segments of the optical fiber can be connected to realize optical fiber communication.

The basic composition of the optical port assembly 1 and the working principle thereof are approximately stated as follows.

As shown in FIG. 1, the optical port assembly 1 comprises a connector 100 and an adaptor 200, wherein one end of two opposite ends of the connector 100 is connected with an optical fiber 110, and the other end is used for connecting with another connector 100. In order to facilitate the connection of the two connectors 100, one of the connector 100 may be set with a contact pin, the other connector 100 is set with a plug socket, so as to realize the accurate connection between the optical fiber and the connector 100 by inserting the contact pin into the plug socket. The adaptor 200 in the optical port assembly 1 has a hollow accommodation cavity 210, and the accommodation cavity 210 penetrates the adaptor 200. The two connectors 100 respectively extend into the accommodation cavity 210 from two opposite ends of the adaptor 200 for connection, so as to realize the connection between the optical fibers 110 which are connected to the two connectors 100. Meanwhile, the connector 100 is fixed to the adaptor 200, so that the connector 100 can be stably connected.

Figure 2:
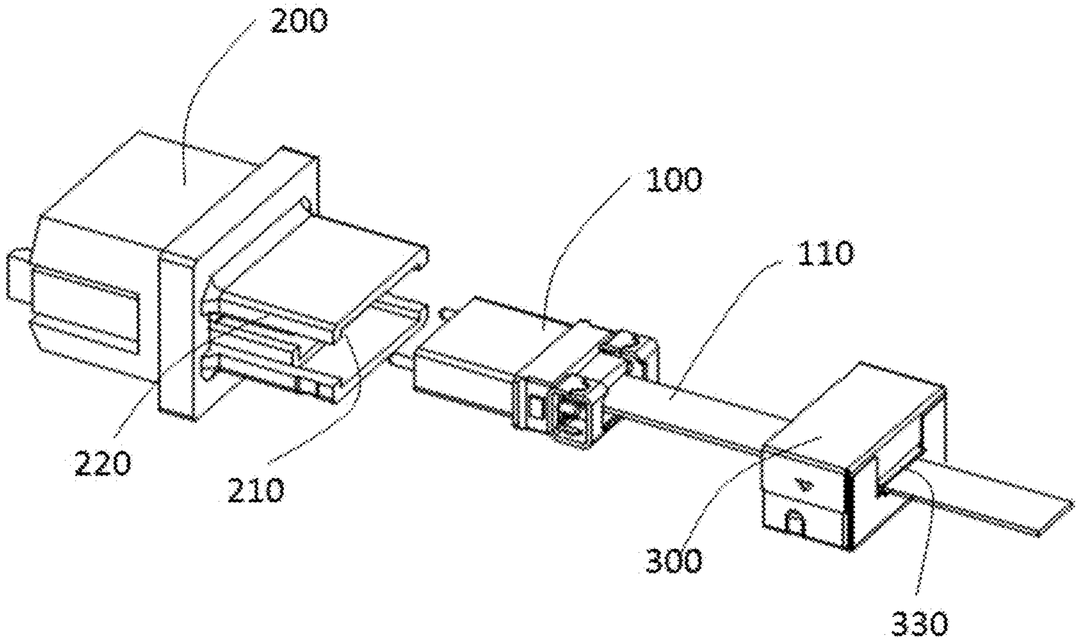
FIG. 2 is an assembly schematic diagram of an optical port assembly according to an embodiment of the present disclosure.

In an embodiment of the present disclosure, as shown in FIG. 2, the optical port assembly 1 comprises a connector 100, an adaptor 200, and a shield 300. One end of the connector 100 along a first direction is connected with the optical fiber 110. Specifically, the connector 100 has two opposite ends in the first direction, wherein the first direction is the extension direction of the optical fiber 110, that is, the left-right direction as shown in FIG. 2; and the optical fiber 110 is connected with one end of the two opposite ends. The number of the optical fibers 110 may be one or more, and the specific number thereof can be selected according to the actual use. The connector 100 is connected with the adaptor 200, wherein the adaptor 200 has an accommodation cavity 210 extending along the first direction (the left-right direction as shown in FIG. 2), and one end of the connector 100 far away from the optical fiber 110 extends into the accommodation cavity 210 along the first direction (the left-right direction as shown in FIG. 2). Specifically, the adaptor 200 is formed by being surrounded by the housing 220, a hollow accommodation cavity 210 is formed inside the housing 220. The accommodation cavity 210 penetrates the adaptor 200 along an extension direction of the optical fiber 110 to be used as a cavity for accommodating the connector 100, and the accommodation cavity 210 is in connection with the outside. During assembly, the two connectors 100 extend into the accommodation cavity 210 to be connected, and to be fixed to the adaptor 200, so that the optical fiber 110 can realize stable connection. Alternatively, the adaptor 200 may be a plastics product, and it can also be a metal product.

Figure 3:
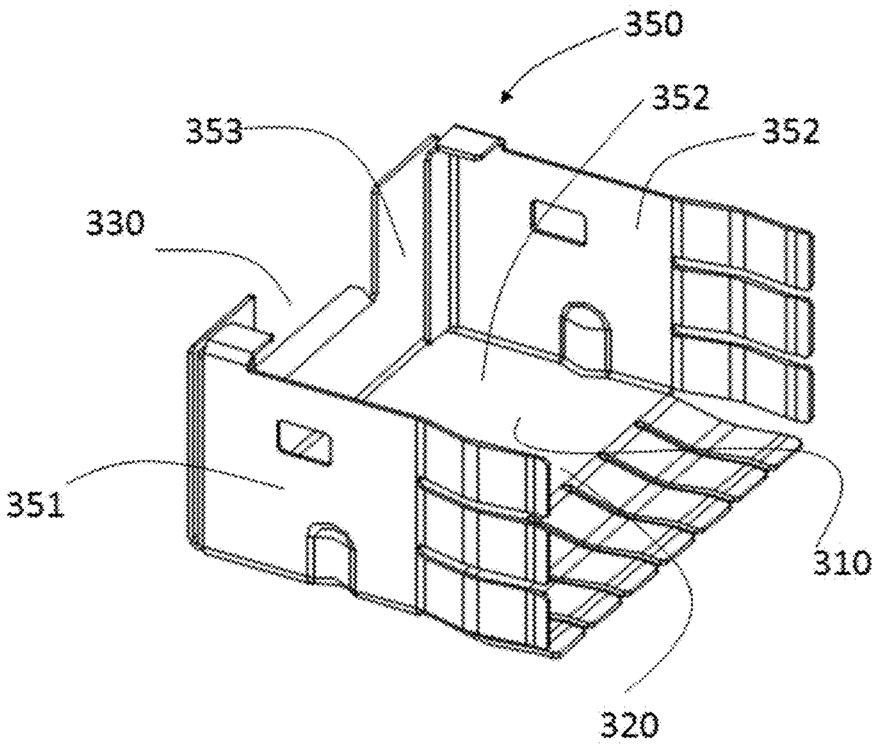
FIG. 3 is a structure schematic diagram of a second shield cover according to an embodiment of the present disclosure.

Combined with FIG. 2 and FIG. 3, the shield 300 in the optical port assembly 1 has a hollow matching cavity 310, and the shield 300 is provided with openings in connection with the matching cavity 310 at two opposite ends along the first direction (the left-right direction as shown in FIG. 3). The adaptor 200 is fixed by extending into the matching cavity 310 through one of the openings, and the other opening is used to be inserted by the optical fiber 110. Specifically, the shield 300 surrounds the outer surface of the housing 220 of the adaptor 200 to wrap the adaptor 200, and the shield 300 is made of metal, for example, copper, iron, etc., wherein the shield 300 may completely wrap the adaptor 200, and may also partially wrap the adaptor 200. Alternatively, the shield 300 may be integrally formed. Alternatively, it may be formed by splicing a plurality of wall plates, and the splicing mode of the wall plates may be welding, bonding and other modes. For example, the openings are provided at two opposite ends of the shield 300, and the two openings are connected with the matching cavity 310, wherein one of the openings is used for loading the adaptor 200 into the matching cavity 310, and the other opening is used for enabling the optical fiber 110 to extend out of the shield 300. For convenience of explanation, one of the openings is referred to as a first opening 320, and the other opening is referred to as a second opening 330. When the adopted shield 300 is integrally formed, the installation step of the optical port assembly 1 is, firstly, extending on an end of the connector 100 with the optical fiber 110 far away from the optical fiber 110 into the accommodation cavity 210 of the adaptor 200, a connection point between the connector 100 and the optical fiber 110 extends into the accommodation cavity 210, and the optical fiber 110 extends out of the accommodation cavity 210 and extends out of the adaptor 200. The shield 300 is installed on the outer surface of the housing 220 of the adaptor 200 through the first opening 320, and the connection point of the optical fiber 110 of the connector 100 is wrapped within the shield 300, and the optical fiber 110 extends out of the shield 300 from the second opening 330. The size of the matching cavity 310 in the shield 300 is slightly larger than the profile dimension of the adaptor 200, so that the shield 300 can be smoothly installed in the adaptor 200 and can also be in close contact with the housing 220 of the adaptor 200.

As shown in FIG. 3, the size of the second opening 330 is substantially the same as a section size of the optical fiber 110 along a second direction; and the first direction (the left-right direction as shown in FIG. 3) is substantially perpendicular to the second direction. The second direction is approximately perpendicular to the extension direction of the length of the optical fiber 110, that is, the up-down direction as shown in FIG. 3. Specifically, the cross-section of the optical fiber 110 along the second direction (the up-down direction as shown in FIG. 3); that is, the size of the cross-section thereof, is substantially the same as the size of the second opening 330 of the shield 300 for the extension of the optical fiber 110. The so-called substantially the same is required not absolutely identical, taking into account the assembly error; that is, the size of the second opening 330 just accommodates the optical fiber 110 to pass through, and the optical fiber 110 may be in contact with the metal plate surrounding the second opening 330. During the installation process of the optical port assembly, firstly, the connector 100 is fixed to the adaptor 200, and the connector 100 is connected with the optical fiber 110. After the connector 100 is fixed to the adaptor 200, the connection joint between the connector 100 and the optical fiber 110 is relatively fixed relative to the position of the adaptor 200, and the shield 300 is also relatively fixed to the adaptor 200, so that the relative position between the shield 300 and the connector 100 is also fixed; that is, the optical fiber 110 connected to the connector 100 is also relatively fixed to the position of the shield 300, so that it is convenient to open on the shield 300 in advance a second opening 330 for the optical fiber 110 to pass through, and the second opening 330 on the shield 300 is minimized without worrying about the damage of the optical fiber 110.

An optical port assembly provided by the embodiment of the present disclosure comprises a connector, an adaptor, and a shield. The connector is connected with an optical fiber. The adaptor has an accommodation cavity, and the connector extends into the accommodation cavity to be fixed, so that the relative position between the connector and the adaptor is fixed. The shield has a hollow matching cavity, and the adaptor extends into the matching cavity to fixedly connect with the adaptor and the shield, so that the relative position of the shield and the adaptor is fixed. As a result, the position of the shield and the optical fiber is relatively fixed too. In the present disclosure, the wrapping range of the shield is increased through completely wrapping the shield on the adaptor; meanwhile, the relative position between the shield and the adaptor is also defined, so that the relative position between the shield and the optical fiber is further fixed, and then the position of the second opening on the shield which is for the optical fiber to pass through is determined. Moreover, due to the fact that the relative position between the second opening and the optical fiber is fixed, the size of the second opening may be approximately the same as the size of the optical fiber perpendicular to the length direction of the optical fiber, so as to realize the minimization of the second opening and then reduce the electromagnetic leakage at the second opening and enhance the effect of the electromagnetic shielding.

Figure 4:
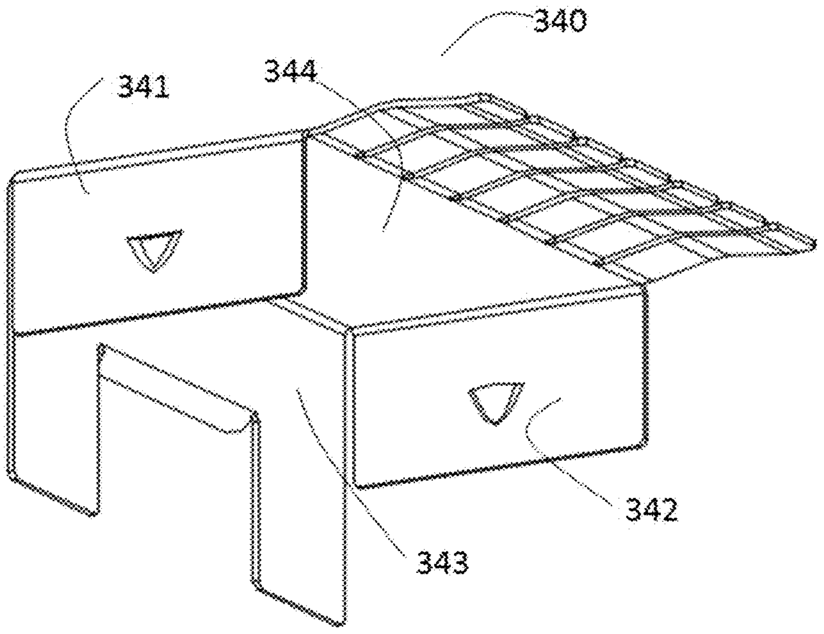
FIG. 4 is a structure schematic diagram of a first shield cover according to an embodiment of the present disclosure.
Figure 5:
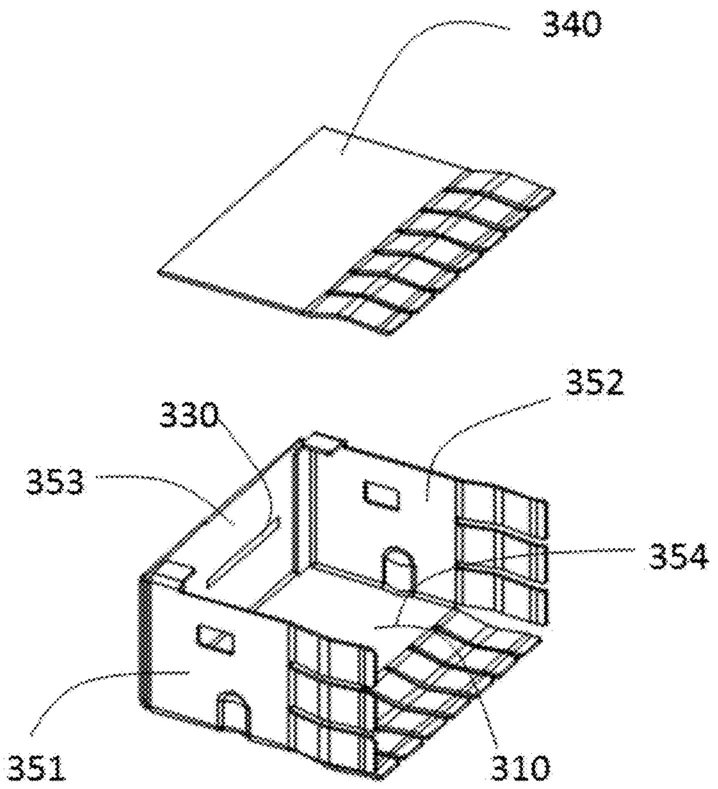
FIG. 5 is a structure schematic diagram of a shield according to an embodiment of the present disclosure.

In some embodiments, as shown in FIG. 3 and FIG. 4, the shield 300 comprises a first shield cover 340 and a second shield cover 350 which are detachably connected, and the first shield cover 340 and the second shield cover 350 are connected to form the matching cavity 310. The detachable connection may be a sliding connection and may also be a snap-in connection. For example, the first shield cover 340 comprises a first sidewall 341, a second sidewall 342, a third sidewall 343, and a first bottom wall 344, wherein the first sidewall 341 and the second sidewall 342 are respectively connected to two opposite ends of the third sidewall 343, forming an approximately U-shaped structure, and the first sidewall 341, the second sidewall 342 and the third sidewall 343 are all connected to the first bottom wall 344. The second shield cover 350 comprises a fourth sidewall 351, a fifth sidewall 352, a sixth sidewall 353 and a second bottom wall 354; wherein the fourth sidewall 351 is connected with the first sidewall 341, the fifth sidewall 352 is connected with the second sidewall 342, and the sixth sidewall 353 is connected with the third sidewall 343. Alternatively, the second opening 330 may be separately set on the third sidewall 343 or the sixth sidewall 353, and may also be set on the third sidewall 343 and the sixth sidewall 353 at the same time. Alternatively, at least one of the first sidewall 341 and the second sidewall 342 is set with a protrusion, and one groove is at least set for the fourth sidewall 351 and the fifth sidewall 352 correspondingly. The protrusion extends into the groove to fix the first shield cover 340 and the second shield cover 350. Alternatively, as shown in FIG. 5, the first shield cover 340 may also be in a flat plate shape, the second shield cover 350 comprises a fourth sidewall 351, a fifth sidewall 352, a sixth sidewall 353 and a second bottom wall 354, wherein the fourth sidewall 351 and the fifth sidewall 352 are set in parallel and are respectively connected with one end of the second bottom wall 354; the sixth sidewall 353 is connected with the fourth sidewall 351, the fifth sidewall 352 and the second bottom wall 354; the sixth sidewall 353 is set with a second opening 330 which is for the optical fiber 110 to pass through; slides are set on both of the fourth sidewall 351 and the fifth sidewall 352; and the first shield cover 340 is connected with the fourth sidewall 351 and the fifth sidewall 352 through the slides, forming the matching cavity 310 with openings at two opposite ends.

The shield comprises the first shield cover and the second shield cover, which is convenient for the shield to be detached and installed from the adaptor, and the assembly efficiency is improved.

Figure 6:
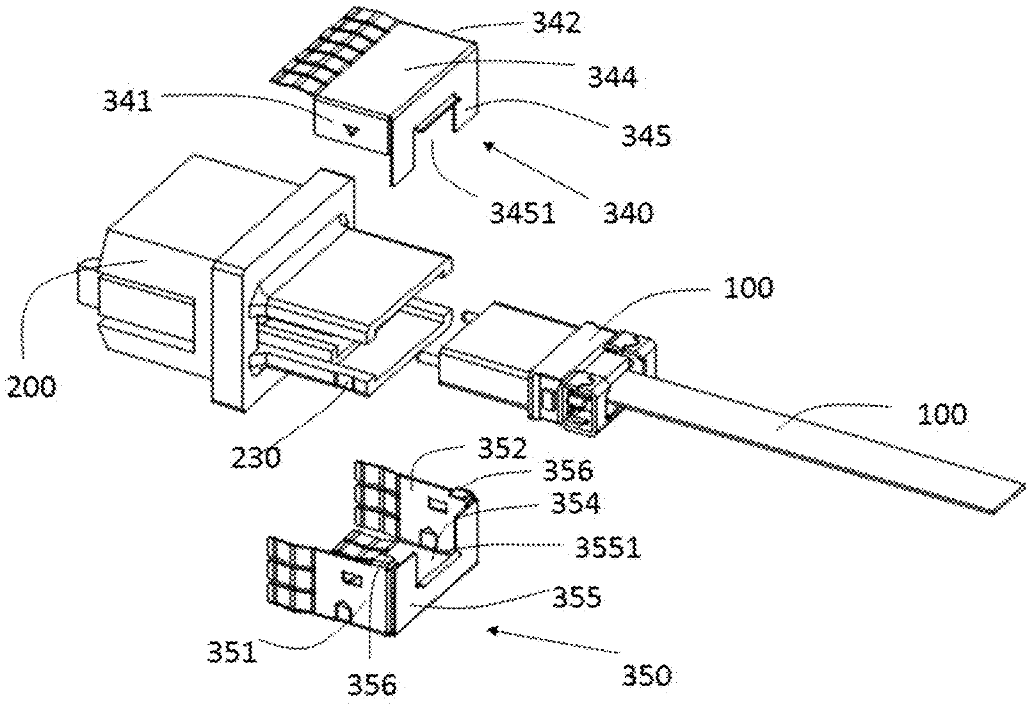
FIG. 6 is an assembly schematic diagram of another optical port assembly according to an embodiment of the present disclosure.

In some embodiments, as shown in FIG. 6, the first shield cover 340 is set with a first limit piece 345, the second shield cover 350 is set with a second limit piece 355, and the first limit piece 345 abuts against the second limit piece 355 to limit the offset of the first shield cover 340 relative to the second shield cover 350 in the first direction (the left-right direction as shown in FIG. 6). Specifically, the first shield cover 340 is set with a first sidewall 341 and a second sidewall 342 which are relatively set, the first sidewall 341 and the second sidewall 342 are respectively connected with the first bottom wall 344, and the first limit piece 345 is connected with the first bottom wall 344, wherein the first limit piece 345 is in a flat plate shape. The second shield cover 350 is set with a fourth sidewall 351 and a fifth sidewall 352 which are relatively set, and the fourth sidewall 351 and the fifth sidewall 352 are respectively connected with the second bottom wall 354. The second limit piece 355 is connected with the second bottom wall 354, wherein the second limit piece 345 is also in a flat plate shape. Moreover, a certain gap exists between the second limit piece 355 and the fourth sidewall 351 and between the second limit piece 355 and the fifth sidewall 352, and the first limit piece 345 may be inserted into the gap to abut against the second limit piece 355; that is, the first limit piece 345 and the second limit piece 355 are in contact with each other to prevent the first shield cover 340 from offsetting in the first direction (the left-right direction as shown in FIG. 6) relative to the second shield cover 350.

The first limit piece on the first shield cover extends into the gap formed by the second limit piece on the second shield cover, so that the first limit piece may only move within the range of the gap, thereby limiting the offset of the first shield cover relative to the second shield cover in the first direction, and meanwhile, facilitating the assembly of the first shield cover and the second shield cover.

In some embodiments, as shown in FIG. 6, at least one of the first shield cover 340 and the second shield cover 350 is set with a locating piece 356 to limit the offset of the first shield cover 340 relative to the second shield cover 350 in the second direction. Specifically, the locating piece 356 may be an L-shaped structure, one end of which is connected with the second bottom wall 354, and the other end is used for supporting the first bottom wall 344 of the first shield cover 340. For example, there are provided with two locating piece 356, respectively connected with the fourth sidewall 351 and the sixth sidewall 353, wherein one end of the locating piece 356 far away from the second bottom wall 354 is bent. During installation, the first shield cover 340 and the second shield cover 350 are installed, and the first bottom wall 344 abuts against the locating piece 356 to limit the first shield cover 340 to continue to move along the second direction (the left-right direction as shown in FIG. 6). Moreover, a gap exists between the locating piece 356 and the second limit piece 355, and the first limit piece 345 is inserted into the gap between the second limit piece 355 and the locating piece 356 to limit the offset of the first shield cover 340 in the first direction.

The locating piece may be set on the first shield cover and may also be set on the second shield cover, and the relative position between the first shield cover and the second shield cover in the second direction (the up-down direction as shown in FIG. 6) is limited through the locating piece during installation, thus realizing the installation location.

In some embodiments, as shown in FIG. 6, the first shield cover 340 is set with a first notch 3451, the second shield cover 350 is set with a second notch 3551, and in a state where the first shield cover 340 is connected with the second shield cover 350, the first notch 3451 is connected with the second notch 3551 to form another opening which is the second opening 330 here. Specifically, the first notch 3451 and the second notch 3551 may be U-shaped notches, and the two U-shaped notches are relatively set so as to be spliced as a second opening 330 facilitating the optical fiber 110. For example, the first notch 3451 is set on the first limit piece 345, the second notch 3551 is set on the second limit piece 355, wherein the notch of the first notch 3451 is opposite to the notch of the second notch 3551, and when the first limit piece 345 is connected to the second limit piece 355, the first notch 3451 is connected with the second notch 3551 to form a complete second opening 330.

When the first shield cover and the second shield cover are installed, the first notch and the second notch are connected to form a second opening for the optical fiber to pass through, which is convenient for the direct assembly of the first shield cover and the second shield cover, without firstly passing the optical fiber through the second opening and then installing the first shield cover and the second shield cover.

Figure 7:
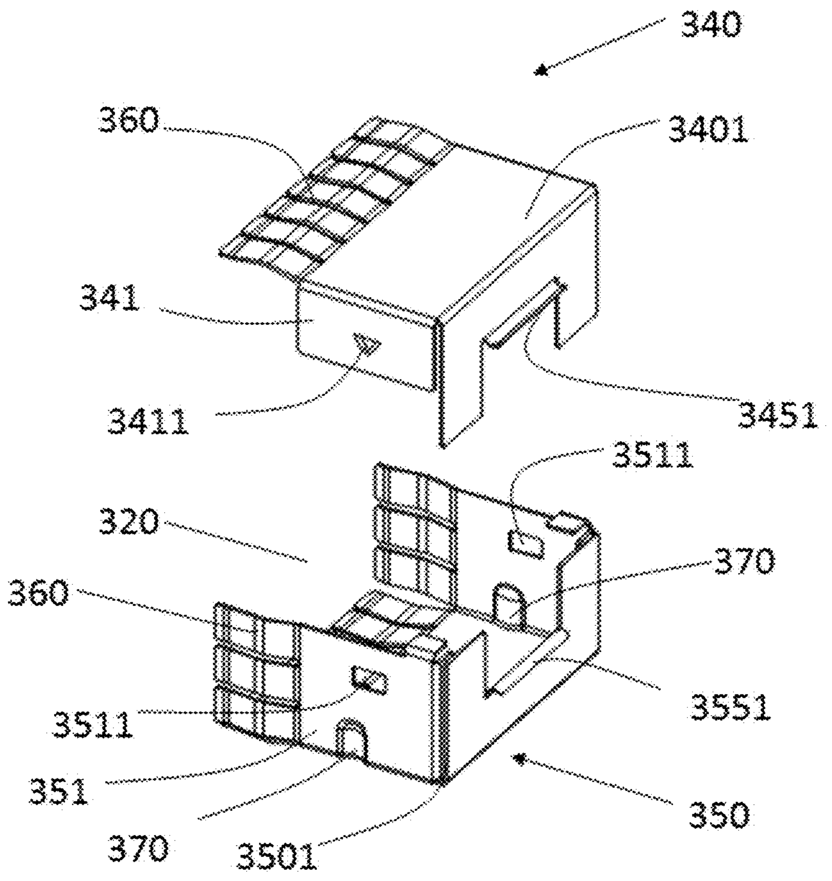
FIG. 7 is a structure schematic diagram of another shield according to an embodiment of the present disclosure.

In some embodiments, as shown in FIG. 7, the first shield cover 340 comprises a first body 3401 and a first flanging 3452. The first flanging 3452 is set at a position of the first body 3401 near the first notch 3451, and the first flanging 3452 protrudes from the first body 3401 along a first direction (the left-right direction as shown in the figure). The word "near" may be understood as that two parts are bordered; that is, the spacing between the two parts is substantially zero. Specifically, the first flanging 3452 may be a long strip shape, and may be set at the bottom of the groove of the first notch 3451. Alternatively, the first flanging 3452 may also be set at an edge of the first notch 3451 and protrude from the first body 3401 along the extension direction of the optical fiber 110, so as to increase the contact area between the optical fiber 110 and the groove wall of the first notch 3451. The second shield cover 350 comprises a second body 3501 and a second flanging 3552, and the second flanging 3552 is set at a position of the second body 3501 near the second notch 3551 and protrudes from the second body 3501 along the first direction (the left-right direction as shown in the FIG. 7). The word "near" may be understood as that two parts are bordered, that is, the spacing between the two parts is substantially zero. Specifically, the second flanging 3552 may be a long strip shape, and may be set at the bottom of the groove of the second notch 3551. Alternatively, the second flanging 3552 may also be set at the edge of the second notch 3551 and protrudes from the second body 3501 along the extension direction of the optical fiber 110, so as to increase the contact area between the optical fiber 110 and the groove wall of the second notch 3551.

The first flanging is set close to the first notch, and the second flanging is set close to the second notch. By setting the first flanging and the second flanging, the contact area between the optical fiber and the periphery of the second opening is increased, thus avoiding the edges of the first and second notches from being too sharp to damage the optical fiber.

In some embodiments, as shown in FIG. 7, the first shield cover 340 is set with a first protrusion 3411, the second shield cover 350 is set with a first groove 3511, and the first protrusion 3411 extends into the first groove 3511 to connect the first shield cover 340 and the second shield cover 350. The first protrusion 3411 may be set on the first sidewall 341, and the first groove 3511 may be correspondingly set on the fourth sidewall 351. Alternatively, there are provided with two first protrusion 3411 which are respectively set on the first sidewall 341 and the second sidewall 342, and there are also correspondingly provided with two first grooves 3511 which are respectively set on the fourth sidewall 351 and the fifth sidewall 352. Specifically, the first protrusion 3411 protrudes in a direction far away from the first body 3401, and when the first shield cover 340 and the second shield cover 350 are installed, the first protrusion 3411 extends into the first groove 3511, thereby fixing the first shield cover 340 and the second shield cover 350. Alternatively, the first shield cover 340 is set with a first groove 3511, and the second shield cover 350 is set with a first protrusion 3411, wherein the first protrusion 3411 extends into the first groove 3511 to be able to connect the first shield cover 340 and the second shield cover 350.

A first protrusion is set on the first shield cover, and a first groove is set on the second shield cover, or a first groove is set on the first shield cover, the second shield cover is set with a first protrusion. During assembly, the first protrusion extends into the second groove, so that the first shield cover can be stably fixed with the second shield cover.

In some embodiments, as shown in FIG. 7, one end of the shield 300 near an opening is provided with a reed 360 which extends along a first direction (the left-right direction as shown in the FIG. 7), and the reed 360 has an radian protruding to a direction far away from the matching cavity 310. One opening is the first opening 320. Specifically, the reed 360 has certain elasticity, one end of the reed 360 is connected with the shield 300, wherein the reed 360 is connected to the shield 300 near the first opening 320. Alternatively, the reed 360 may be set to be plurality, and may be set to be around the first opening 320. The reed 360 has a radian protruding towards the matching cavity 310; that is, the reed 360 is not a straight line. During assembly, one end of the reed 360 is connected with the shield 300, and the other end is in contact with the adaptor 200, so as to help the shield 300 to be in close connection with the adaptor 200.

Through the reed being set to be around the first opening of the shield, during assembly, the reed provides pressure to help the shield to be in close contact with the adaptor, and the reed has a radian, so that the peak pressure of the reed is higher than the height of the shield, thereby facilitating the grounding of the shield, and improving the effect of the electromagnetic shielding of the shield.

In some embodiments, as shown in FIG. 6 and FIG. 7, the shield 300 is set with a first clamping piece 370, the adaptor 200 is set with a second clamping piece 230, wherein the first clamping piece 370 and the second clamping piece 230 are clamped with each other to fix the shield and the adaptor 200. Specifically, there may be provided with two first clamping pieces 370 which may be respectively set on the fourth sidewall 351 and the fifth sidewall 352. Alternatively, the first clamping piece 370 may also be set on the first sidewall 341 and the second sidewall 342. The second clamping piece 230 is set on a housing 220 of the adaptor 200. There may also be provided with two second clamping piece 230 correspondingly. The clamping connection of the first clamping piece 370 and the second clamping piece 230 enables the shield 300 to be tightly connected with the housing 220 of the adaptor 200. For example, the first clamping piece 370 is a convex plate, and the second clamping piece 230 is a groove. During assembly, the convex plate extends into the groove to be fixed, so that the shield 300 is fixed with the adaptor 200.

Figure 8:
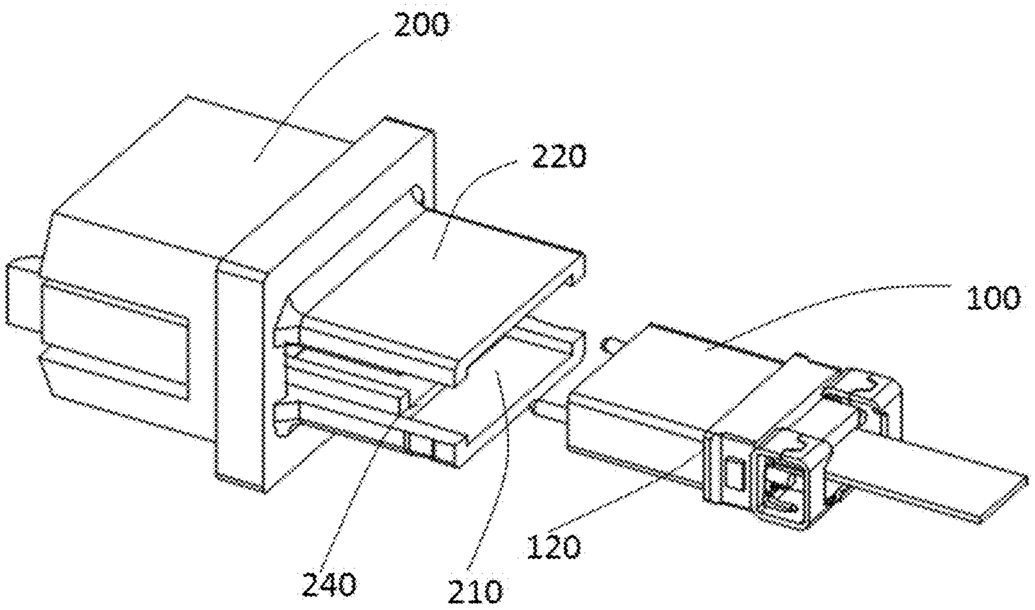
FIG. 8 is an assembly schematic diagram of an adaptor and a connector according to an embodiment of the present disclosure.

In some embodiments, as shown in FIG. 8, the adaptor 200 is set with a first stopper 240, and the connector 100 is set with a second stopper 120, wherein the first stopper 240 abuts against the second stopper 120 in a first direction (the left-right direction as shown in FIG. 8). Specifically, the first stopper 240 is set in the accommodation cavity 210, and the second stopper 120 is set on the connector 100. For example, the first stopper 240 is set with a convex plate for the inner surface clung to the housing 220 of the adaptor 200, and the second stopper 120 is a stepped surface. During assembly, the connector 100 extends into the accommodation cavity 210, and the stepped surface of the connector 100 abuts against the convex plate of the adaptor 200, so that the connector 100 cannot continue to extend along the accommodation cavity 210, thereby realizing to limit the position of the connector 100 relative to the adaptor 200.

Figure 9:
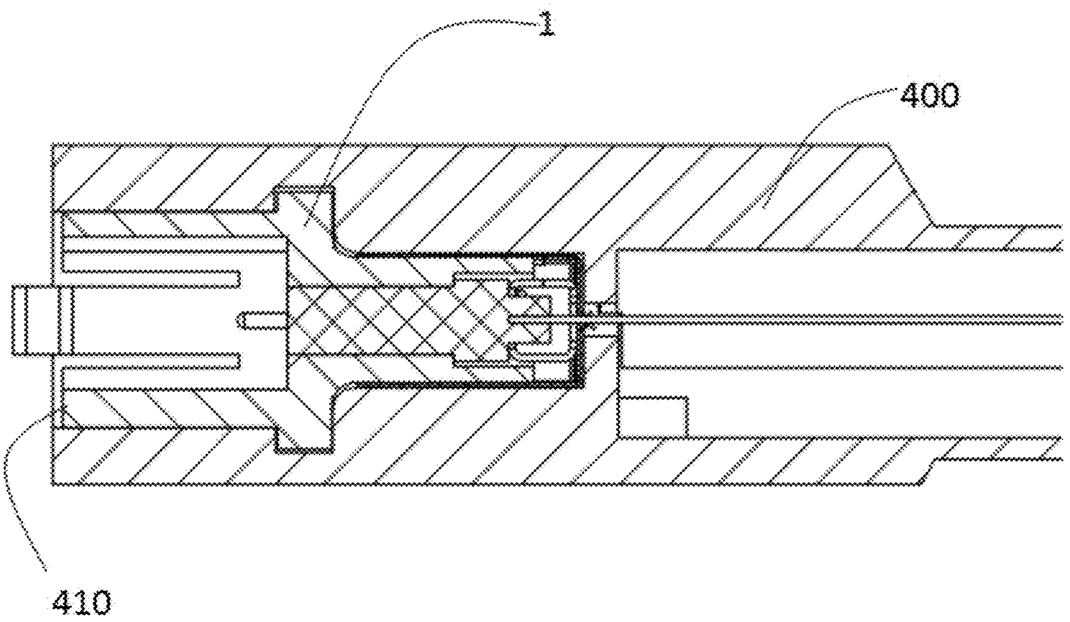
FIG. 9 is a cross-sectional diagram of an optical module according to an embodiment of the present disclosure.

An embodiment of the present disclosure further provides an optical module, as shown in FIG. 9, comprising an optical port assembly 1 and a housing 400, wherein the housing 400 has a hollow installation groove 410, the optical port assembly 1 is installed in the installation groove 410. Specifically, the optical port assembly 1 comprises a connector 100, an adaptor 200, and a shield 300. During installation, after completing the installation of the connector 100 with the adaptor 200 and the shield 300, the connector 100 is installed with the housing 400. The housing 400 is a metal housing having an installation groove 410, and the shape of the installation groove 410 thereof matches the shape solution of the optical port assembly 1 after completing the assembly, so that the outer surface of the optical port assembly 1 is in full contact with the housing 400. Alternatively, as shown in FIG. 10, the housing 400 may comprise an upper housing 420 which is set with a second groove 421, and a lower housing 430 which is set with a third groove 431, and the second groove 421 is connected to the third groove 431 to form an installation groove 410.

In the present disclosure, the optical port assembly is assembled firstly, and then the optical port assembly after completing the assembly is installed in the housing, thereby reducing the assembly error of independent installation of each component, defining the position of the optical fiber relative to the housing, and facilitating the housing to reserve a space for the optical fiber placement. Meanwhile, the optical port assembly can be better in close contact with the housing during installation, thereby improving the electromagnetic shielding effect of the optical port assembly.

Figure 10:
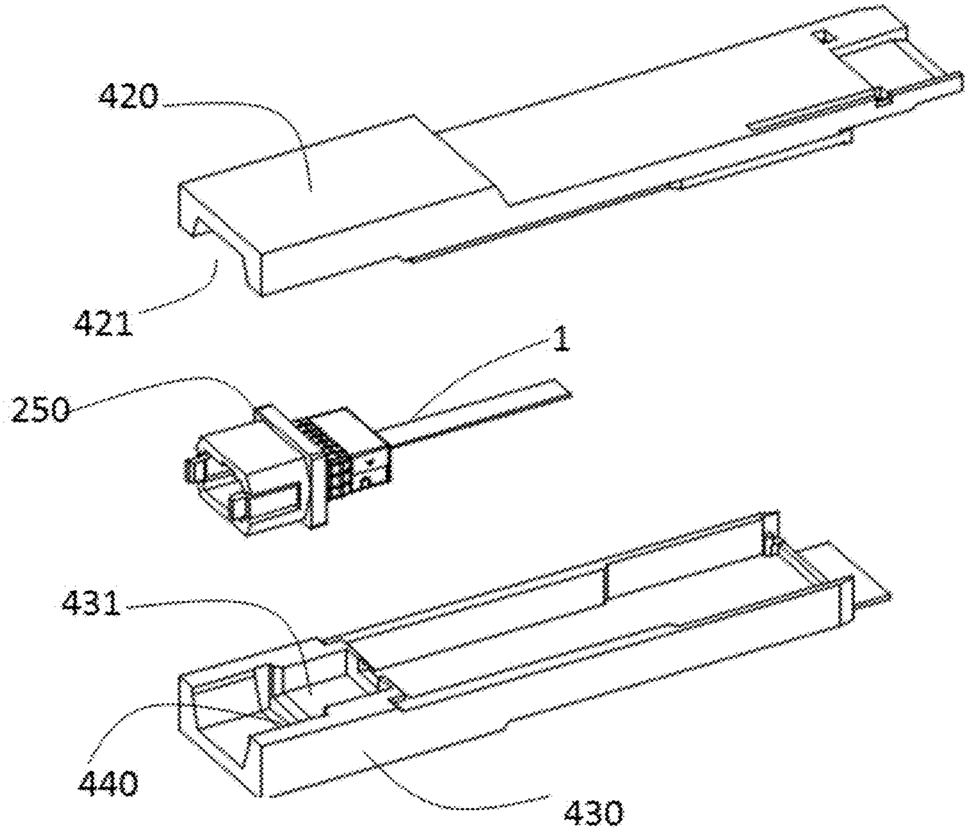
FIG. 10 is a structure schematic diagram of an optical module according to an embodiment of the present disclosure.

In some embodiments, as shown in FIG. 10, the housing 400 is set with a first fixing piece 440, the optical port assembly 1 is set with a second fixing piece 250, and the first fixing piece 440 is connected with the second fixing piece 250 to fix the optical port assembly 1 in the installation groove 410. Specifically, the second fixing piece 250 is set on the adaptor 200; for example, the second fixing piece 250 is a protrusion, and the first fixing piece 440 is a corresponding groove. During installation, the optical port assembly 1 extends into the groove of the first fixing piece 440 through the protrusion of the second fixing piece 250 for fixation, thereby defining the position of the optical port assembly 1, and facilitating the accurate assembly of the optical module.

The above-mentioned description is only the preferred embodiments of the present disclosure and is not intended to limit the protection scope of the present disclosure.

What is claimed is:

1. An optical port assembly, comprising:

a connector, one end of which is connected with an optical fiber along a first direction;

an adaptor, which has an accommodation cavity extending along the first direction, and one end of the connector far away from the optical fiber extends into the accommodation cavity along the first direction;

a shield, which has a hollow matching cavity, and is provided openings in connection with the matching cavity at two opposite ends along the first direction, wherein the adaptor is fixed by extending one of the openings into the matching cavity, and the other of the openings is used for enabling the optical fiber to be inserted;

wherein a size of the other of the openings is substantially the same as a section size of the optical fiber along a second direction; and the first direction is substantially perpendicular to the second direction.

2. The optical port assembly of claim 1, wherein the shield comprises a first shield cover and a second shield cover which are detachably connected, and the first shield cover and the second shield cover are connected to form the matching cavity.

3. The optical port assembly of claim 2, wherein the first shield cover is set with a first limit piece, the second shield cover is set with a second limit piece, and the first limit piece abuts against the second limit piece to limit the first shield cover to offset relative to the second shield cover in the first direction.

4. The optical port assembly of claim 2, wherein at least one of the first shielding cover and the second shield cover is set with a locating piece to limit the first shield cover to offset relative to the second shield cover in a second direction.

5. The optical port assembly of claim 2, wherein the first shield cover is set with a first notch, the second shield cover is set with a second notch, and in a state where the first shield cover is connected with the second shield cover, the first notch is connected with the second notch to form the other opening of the openings.

6. The optical port assembly of claim 5, wherein the first shield cover comprises a first body and a first flanging, the first flanging being set at a position of the first body near the first notch, and the first flanging protruding from the first body along the first direction; and the second shield cover comprises a second body and a second flanging, the second flanging being set at a position of the second body near the second notch, and the second flanging protruding from the second body along the first direction.

7. The optical port assembly of claim 2, wherein the first shield cover is set with a first protrusion, and the second shield cover is set with a first groove, the first protrusion extending into the first groove to connect the first shield cover and the second shield cover; or the first shield cover is set with a first groove, and the second shield cover is set with a first protrusion, the first protrusion extending into the first groove to connect the first shield cover and the second shield cover.

8. The optical port assembly of claim 1, wherein one end of the shield near the one of the openings is provided with a reed which extends along the first direction, and the reed has a radian protruding to a direction far away from the matching cavity.

9. The optical port assembly of claim 1, wherein the shield is set with a first clamping piece, and the adaptor is set with a second clamping piece, the first clamping piece and the second clamping piece being clamped with each other to fix the shield and the adaptor.

10. The optical port assembly of claim 1, wherein the adaptor is set with a first stopper, and the connector is set with a second stopper, the first stopper abutting against the second stopper in the first direction.

11. An optical module, comprising:

an optical port assembly;

a housing, which has a hollow installation groove, and the optical port assembly is installed in the installation groove, wherein optical port assembly comprises:

a connector, one end of which is connected with an optical fiber along a first direction;

an adaptor, which has an accommodation cavity extending along the first direction, and one end of the connector far away from the optical fiber extends into the accommodation cavity along the first direction;

a shield, which has a hollow matching cavity, and is provided openings in connection with the matching cavity at two opposite ends along the first direction, wherein the adaptor is fixed by extending one of the openings into the matching cavity, and the other of the openings is used for enabling the optical fiber to be inserted;

wherein a size of the other of the openings is substantially the same as a section size of the optical fiber along a second direction; and the first direction is substantially perpendicular to the second direction.

12. The optical module of claim 11, wherein the housing is set with a first fixing piece, and the optical port assembly is set with a second fixing piece, the first fixing piece being connected with the second fixing piece to fix the optical port assembly in the installation groove.

13. The optical module of claim 11, wherein the shield comprises a first shield cover and a second shield cover which are detachably connected, and the first shield cover and the second shield cover are connected to form the matching cavity.

14. The optical module of claim 13, wherein the first shield cover is set with a first limit piece, the second shield cover is set with a second limit piece, and the first limit piece abuts against the second limit piece to limit the first shield cover to offset relative to the second shield cover in the first direction.

15. The optical module of claim 13, wherein at least one of the first shielding cover and the second shield cover is set with a locating piece to limit the first shield cover to offset relative to the second shield cover in a second direction.

16. The optical module of claim 13, wherein the first shield cover is set with a first notch, the second shield cover is set with a second notch, and in a state where the first shield cover is connected with the second shield cover, the first notch is connected with the second notch to form the other opening of the openings.

17. The optical module of claim 16, wherein the first shield cover comprises a first body and a first flanging, the first flanging being set at a position of the first body near the first notch, and the first flanging protruding from the first body along the first direction; and the second shield cover comprises a second body and a second flanging, the second flanging being set at a position of the second body near the second notch, and the second flanging protruding from the second body along the first direction.

18. The optical module of claim 13, wherein the first shield cover is set with a first protrusion, and the second shield cover is set with a first groove, the first protrusion extending into the first groove to connect the first shield cover and the second shield cover; or the first shield cover is set with a first groove, and the second shield cover is set with a first protrusion, the first protrusion extending into the first groove to connect the first shield cover and the second shield cover.

19. The optical module of claim 11, wherein one end of the shield near the one of the openings is provided with a reed which extends along the first direction, and the reed has a radian protruding to a direction far away from the matching cavity.

20. The optical module of claim 11, wherein the shield is set with a first clamping piece, and the adaptor is set with a second clamping piece, the first clamping piece and the second clamping piece being clamped with each other to fix the shield and the adaptor.

* * * * *